I. JEWELL.
Harvester Rake.
No. 32,400. Patented May 21, 1861.
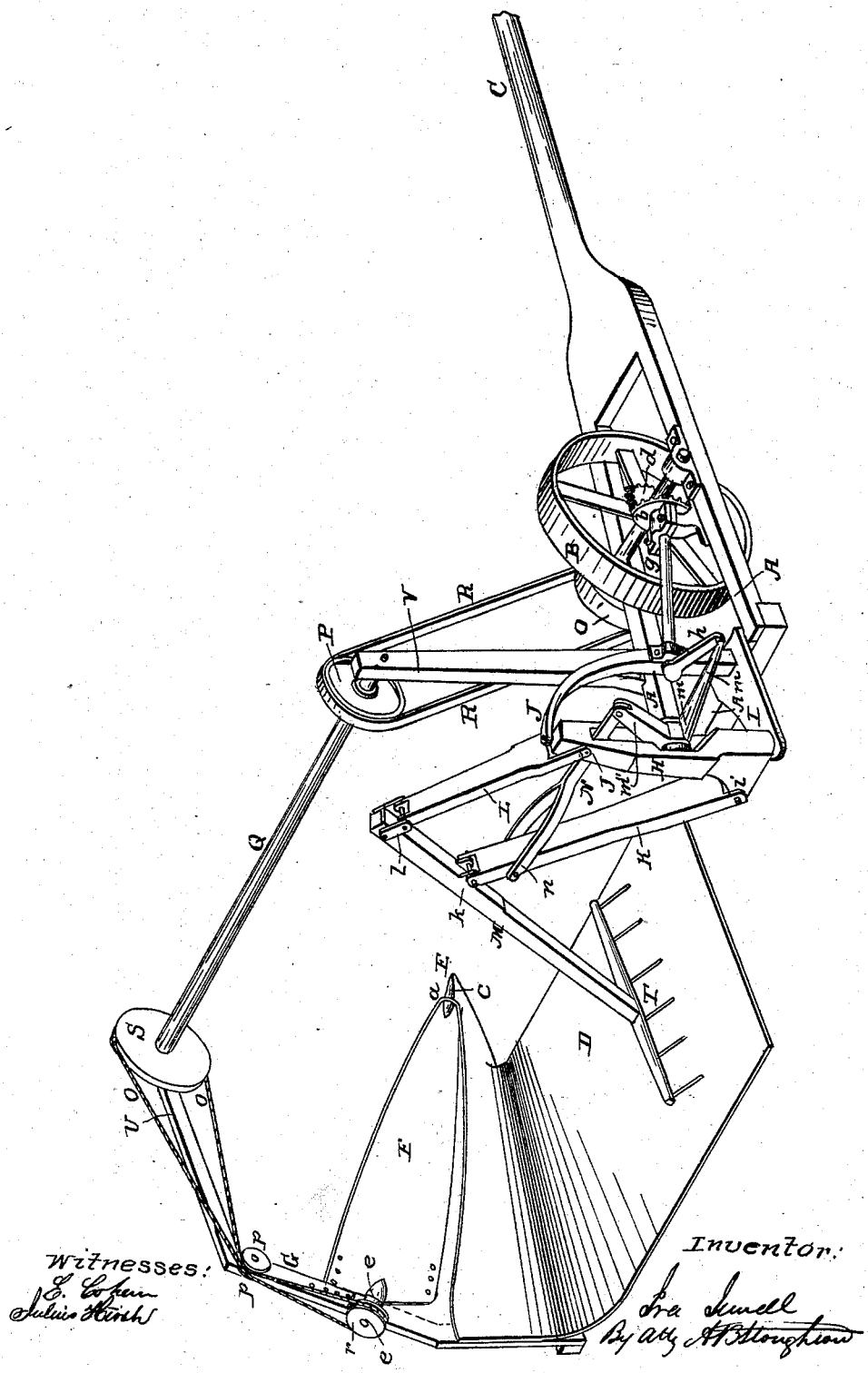

ary rake, which can only reach to a certain extent, but it is very advan-

UNITED STATES PATENT OFFICE.

IRA JEWELL, OF WHEATON, ILLINOIS, ASSIGNOR TO DAVID M. OSBORNE, OF AUBURN, NEW YORK.

IMPROVEMENT IN HARVESTERS.

Specification forming part of Letters Patent No. 32,400, dated May 21, 1861.

*To all whom it may concern:*

Be it known that I, IRA JEWELL, of Wheaton, in the county of Du Page and State of Illinois, have invented certain new and useful Improvements in Connection with the Gathering and Delivering Apparatus of Harvesting-Machines, and which I denominate a "revolving wing-board;" and I do hereby declare that the following is a full, clear, and exact description of the same, reference being had to the accompanying drawing, making a part of this specification, and which represents in perspective so much of a harvesting-machine as will illustrate my invention.

When an automatic rake or delivery is used on a harvesting-machine, a difficulty is found in making the rake reach far enough, without reaching too far, to catch the grain at the grain end of the platform. The grain, too, often hangs on the outside divider or wing-board, and the rake cannot seize or gather it.

The object of my invention is to provide a remedy for this existing evil.

I am aware that a roller has been arranged on top of the outside divider to aid the straw in being drawn in onto the platform, the roller running simply by the friction of the straw drawn over it.

I am also aware that a conical roller has been arranged over or in connection with the outside divider for turning the straw onto the platform; but when the outer ends of the straw are locked or entangled with the standing grain the cone roller will turn without carrying the straw, but slip under it.

Now, my invention consists in putting a revolving wing-board over or in connection with the outside divider, the wing-board having the property of lifting up, carrying, and forcing the grain or straw onto the platform, where it can be readily seized by a rake, and thus a regular and even delivery of the gavel made, which cannot be done by either the cylindrical friction-roller or the cone-driven roller heretofore used over the outside divider for that purpose.

To enable others skilled in the art to make and use my invention, I will proceed to describe the same with reference to the drawings.

A represents the main frame; B, the main supporting and driving wheel; C, the tongue; D, the platform, and E the outside shoe or divider.

F is a tapering wing-board, its lower and forward end having a journal, *a*, that fits and turns in a socket, *c*, near the point of the outside divider, E. The rear end of the wing-board is furnished also with a journal, *e*, that is supported in a box or bearing that may be adjustable vertically and laterally for changing the position or inclination of the wing-board. The vertical adjustment may be by holes in the post G and the lateral by shifting the bearing of the journal *e* from one side of the post to the other, or by putting the journal-box on a bracket or other device fastened to said post.

On the shaft or axle *f* of the main wheel B there is a bevel-gear, *d*, which turns another bevel-gear, *b*, on the shaft *g*, the other end of said shaft having a crank, *h*, upon it for operating a rake, as follows: A post, H, is pivoted in the frame-piece I, at its bottom, and in the brace J, at its top. To this post is pivoted, at *i j* respectively, the two arms K L, each arm being pivoted, respectively, to the rake-handle M at the points *k l*. In a mortise in the post H is hung a skewed crank, *m*, the arm *m'* of which is connected to the crank *h*, and the other arm, *m''*, to a connecting-rod, N, pivoted to the arm K at *n*, which connection, when the machine is moving, gives the rake its movement over the platform, as well as its circular movement to return for the next operation, without interfering with the falling grain.

Upon the shaft *f* there is a pulley, O, over which and over a pulley, P, on the reel-shaft Q passes an endless belt, R, which may drive the reel; and at the outer end of the reel-shaft Q there is a pulley, S, over which a belt or cord, *o*, passes, and thence over friction-rollers *p* and down to and around a pulley, *r*, on the journal *e* of the wing-board F to drive said wing-board, which is revolved toward the platform for the purpose of lifting up, carrying, or throwing over all the straw that would otherwise lodge upon it onto the platform and, within the certain reach or grasp of the rake T. This wing-board is not only of great value to an automatic rake, which can only reach to a certain extent, but it is very advantageous in hand-raking. If it is desirable to stop the rotation of the wing-board, the belt may be thrown off and the wing-board given its proper inclination toward the outside divider or platform, and held there by a hook (shown in red) catching into one of the holes in the wing-board, or by any other known catching and holding device.

U V represent the reel posts or supports.

Having thus fully described the nature and object of my invention, what I claim is—

In combination with the outside divider or grain end of a platform or grain-table, a revolving wing-board that is driven mechanically for the purpose of lifting up and carrying or throwing over the cut straw onto the platform, where it can be conveniently reached by an automatic or other rake, substantially as herein described.

IRA JEWELL.

Witnesses:
DANIEL RANSOM,
J. A. HOISINGTON.